June 6, 1967  J. A. VANDERJAGT  3,323,195
COOLANT ADAPTER FOR TOOL HOLDER
Filed Jan. 18, 1967
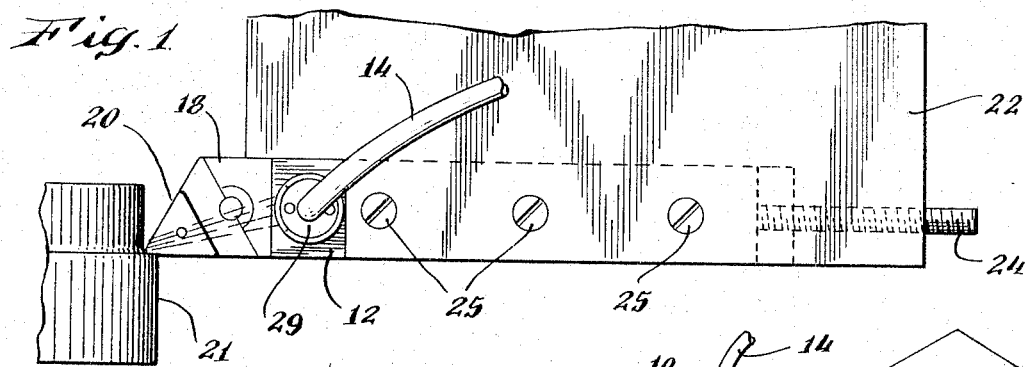
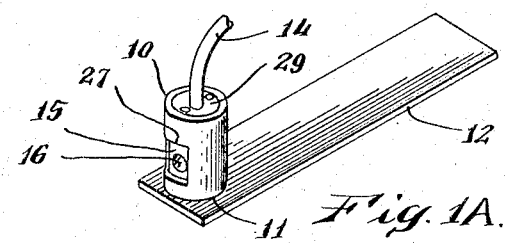
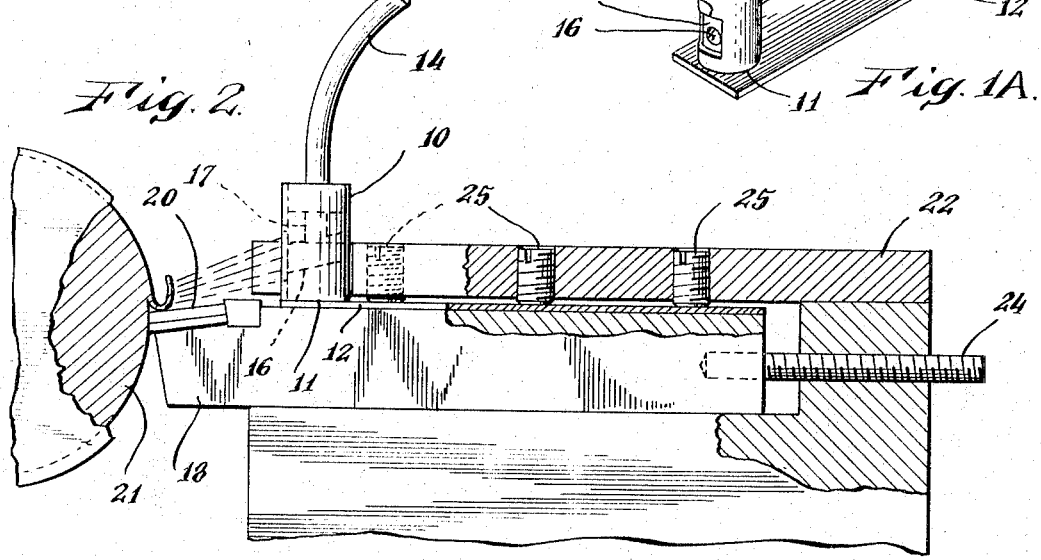
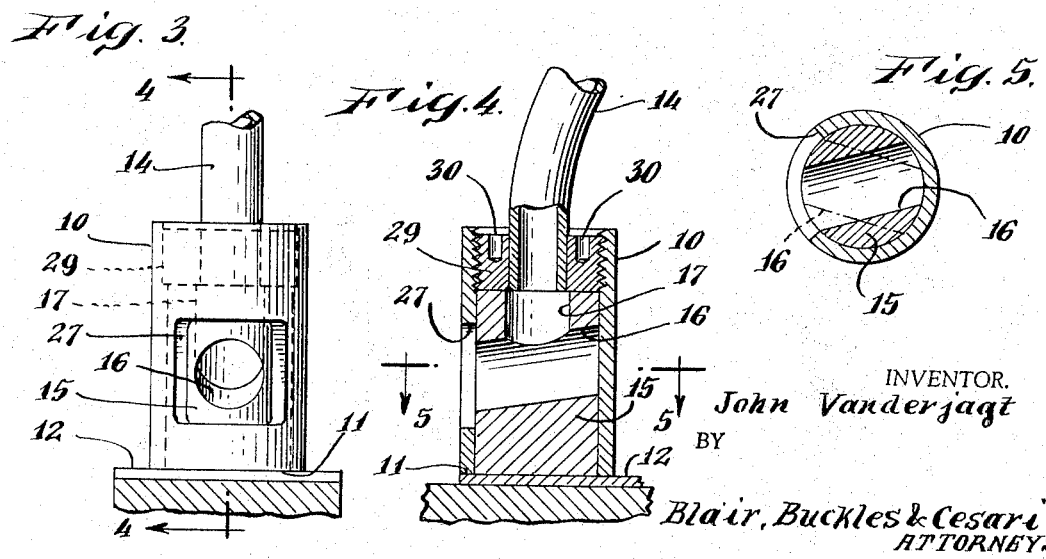
INVENTOR.
John Vanderjagt
BY
Blair, Buckles & Cesari
ATTORNEYS.

United States Patent Office 3,323,195
Patented June 6, 1967

3,323,195
COOLANT ADAPTER FOR TOOL HOLDER
John A. Vanderjagt, Memphis, Tenn., assignor to Scienco, Inc., Memphis, Tenn.
Filed Jan. 18, 1967, Ser. No. 610,064
2 Claims. (Cl. 29—106)

ABSTRACT OF THE DISCLOSURE

The disclosed coolant adapter for tool holders is formed of a thin metal strip to one end of which is secured a cylindrical member containing a fluid directing orifice which is rotatably adjustable through a limited angle about a vertical axis, and which contains provision for securely connecting a flexible coolant fluid line. The thin strip base is of the same width as a standard type machine tool holder and is thus adapted to rest on the top plane surface of a standard tool holder, and in this position it is thin enough to slide along with the tool holder into standard conventional machine tool holder clamping means as found on all lathes and similar machine tools.

Background and objects of the invention

The desirability of applying fluid coolant at the point of metal cutting has long been recognized, especially to affect high speed machining operations without excessive abrasion, wear or softening of the cutting edge due to the generation of high heat. The various means heretofore employed for directing and controlling the flow of coolant fluid have included, as the simplest and most common, the provision of a flexibly adjustable spout which the machine operator can hand position in proximity to the point at which he adjusts his machine to make a cut. The chief drawback to this simple solution has been that the operator must reposition the coolant spout as the cut progresses on his machine, and failure to do so promptly may result in excessive heating at the cutting edge with resulting deterioration in quality of cut and possible destruction of the cutting tool. Various means have also been proposed for clamping one end of a flexible coolant line onto a tool holding carriage whereby the positioning of the coolant stream would shift automatically as the cutting tool advances. Most of these arrangements, however, have required modification of the tool carriage itself which was a time-consuming and costly operation. The present invention obviates the disadvantages of the prior art by providing a simple, inexpensive adapter which is small enough to sit upon the top of a standard tool holder and be held in engagement therewith by the existing tool holder clamping means common to all machine tools. By means of this invention the orifice or nozzle carriage of the coolant adapter is positioned a fixed distance from the cutting point and directs the stream of coolant fluid continuously at that point regardless of lateral or radial movement as imparted to the cutting tool by the relative movements between the workpiece and the tool carriage. By the simple expedient of adjustably rotating an inner plug of the coolant adapter, either to the right or left, the coolant stream may be directed to either left or right cutting tool edges. Thus the adapter of the invention will work equally well with any of several different tools and, if desired, the adapter can simply be removed from the tool holder whenever coolant is not required for the particular machining operation.

Accordingly it is an object of the invention to provide a simple, inexpensive coolant adapter suitable for easy use in conjunction with any conventional tool holder.

A further object is to provide adjustable means in such an adapter for directing a coolant stream to either right or left cutting edges, and to secure the adjustable means against further movement once the desired position of the coolant stream has been established.

Other objects of the invention will in part be obvious and will in part appear hereinafter.

The invention accordingly comprises an article of manufacture possessing the features, properties and the relation of elements which will be exemplified in the article hereinafter described, and the scope of the invention will be indicated in the claims.

For a fuller understanding of the nature of the invention reference should be had to the following detailed description taken in connection with the accompanying drawings in which:

FIGURE 1 is a top plan view showing a tool holder clamped in the tool carriage of a lathe and having the coolant adapter of the invention clamped therewith;

FIGURE 1A is a perspective view of the coolant adapter of the invention per se, apart from its engagement with a tool holder;

FIGURE 2 is a side elevation view, partly in section, showing the combination of the coolant adapter, and tool holder clamped in the tool holder carriage of FIGURE 1;

FIGURE 3 is an enlarged front view of the coolant adapter as seen from the point of its cutting tool edge;

FIGURE 4 is a cross-section of the adapter portion taken along the line 4—4 of FIGURE 3; and FIGURE 5 is a horizontal cross-section taken along the line 5—5 of FIGURE 4.

Similar reference characters refer to like parts throughout the several views of the drawings.

General description

The coolant adapter of the invention is best generally seen in the perspective view of FIGURE 1A wherein the cylindrical member 10 is seen fastened at its base 11 to a long thin metal strip 12. A coolant fluid line 14 is brought into the top of the cylinder portion 10, and coolant fluid is ejected from the front orifice 16. The manner in which the adapter of FIGURE 1A is secured in combination with a machine tool holder is illustrated in FIGURES 1 and 2 wherein the coolant fluid is shown being directed to the tip of a left edge cutting tool.

Detailed description

Referring now to FIGURE 1 of the drawings, it will be seen that the coolant adapter base member 12 rests upon the top surface of tool holder 18 which carries a cutting tip 20, the left cutting edge of which is in engagement with a workpiece 21. The combination of coolant adapter plate 12 and tool holder 18 are clamped into the machine tool carriage 22 by set screws 25—25. The forward position of the tool holder 18, in combination with the coolant adapter 10–12, may be adjusted by screw 24 before the final clamping of set screws 25—25. The clamped relationship between the standard tool holder 18 and the coolant adapter of the invention may be better discerned from the side view illustration of FIGURE 2 which is partly cut away to show portions of the combination in cross-section. The cylindrical portion 10, and its internal plug 15 (FIGS. 4 and 5) are preferably formed from machined metal, such as brass, aluminum or iron, and the cylinder 10 is seamed to the metallic strip 12 by brazing or soldering. However, it is to be understood that the coolant adapter of the invention may also be formed of plastic material.

Referring more particularly now to FIGURES 4 and 5, the internal construction of the coolant adapter will be described in its preferred embodiment. In FIGURE 4, it will be seen that the cylinder 10 contains a cylindrical plug 15 having therethrough an angular bore 16 in conjunction with a vertical bore 17 along the axis of the cylinder. Plug 15 is held within cylinder 10 by means of a threaded screw insert 29 which carries the coolant line 14 into alignment with the vertical bore 17. A pair of tool engaging socket holes 30—30 are provided in the top of the screw insert 29 to facilitate tightening the insert 29 into firm engagement with the cylindrical plug 15. An enlarged opening 27 is provided in the front face of the cylinder 10, and the axis of angular bore 16 passes through the opening 27. As seen in FIGURE 5, by loosening the screw insert 29, the cylindrical plug 15 may be rotated through approximately 30° to either side of the center line of opening 27, in order to direct the axis of diagonal bore 16 either to the right or left of the opening 27 and thereby to direct a stream of coolant fluid either to a left cutting edge as shown in FIGURE 1 or to a righthand cutting edge (not shown).

While the invention has been described in terms of a preferred embodiment formed of all metal parts, it is to be understood that cost reduction in mass production may be realized in manufacture by resort to molded plastic parts, in which case the flat strip base member 12 and its normal cylinder portion 10 may be molded as one integral part.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A coolant adapter for tool holders comprising in combination,
 (A) a thin flat base member of substantially the same width as a tool holder and adapted to rest upon a tool holder top surface,
 (B) a cylindrical casing member secured to one end of said flat base member with its cylindrical axis substantially normal to the flat surface of said base member,
  (1) an opening in the wall of said casing member adjacent the end of said base member,
  (2) a cylindrical plug member within said casing and having
   (a) a fluid transmission channel therethrough and in alignment with said casing wall opening,
 (C) a screw plug threadably mounted in the end of said cylindrical casing member opposite said base member and having,
  (1) an axial opening therethrough engaging a fluid coolant line in juxtaposition to said fluid transmission channel, and
  (2) means on said screw plug for controlling the engagement thereof with said cylindrical plug member within said casing.

2. A coolant adapter according to claim 1 wherein said fluid transmission channel comprises,
 (A) an angular bore through opposite cylindrical walls of said cylindrical plug member, and
 (B) a vertical bore along the axis of said cylindrical plug intersecting said angular bore and connecting with the axial opening and fluid coolant line within said screw plug.

References Cited
UNITED STATES PATENTS

| | | | |
|---|---|---|---|
| 2,641,047 | 6/1953 | Jackman | 29—106 X |
| 2,785,457 | 3/1957 | Pigott | 29—106 |
| 2,848,790 | 8/1958 | McMann | 29—106 |

FOREIGN PATENTS

| | | |
|---|---|---|
| 1,279,749 | 1/1961 | France. |

HARRISON L. HINSON, *Primary Examiner.*